Nov. 5, 1935.  L. S. CHALATOW  2,020,254
APPARATUS FOR MEASURING LIQUID LEVEL
Filed July 14, 1934   3 Sheets-Sheet 2
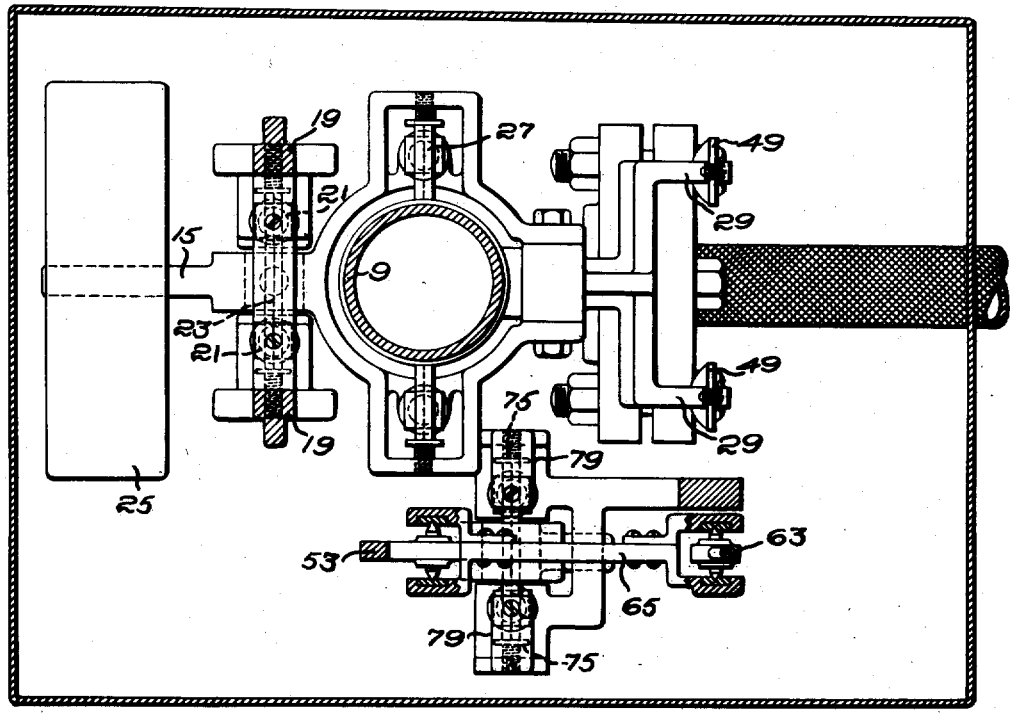
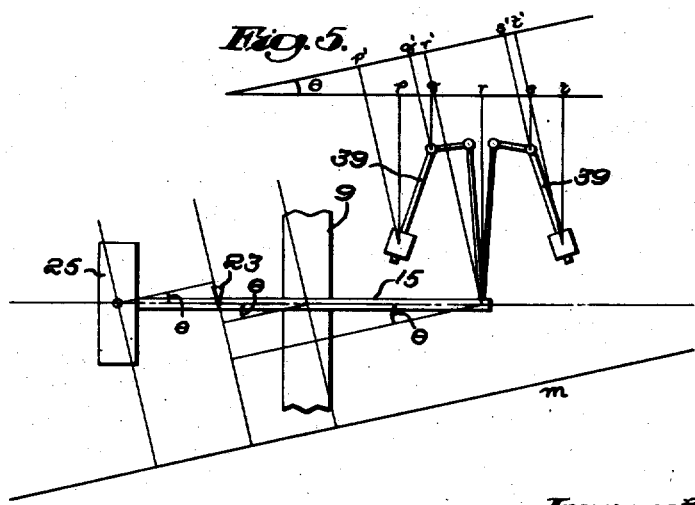
Inventor:
Leon S. Chalatow,
by Emery, Booth, Varney & Townsend
Attys Nov. 5, 1935.  L. S. CHALATOW  2,020,254
APPARATUS FOR MEASURING LIQUID LEVEL
Filed July 14, 1934   3 Sheets-Sheet 3

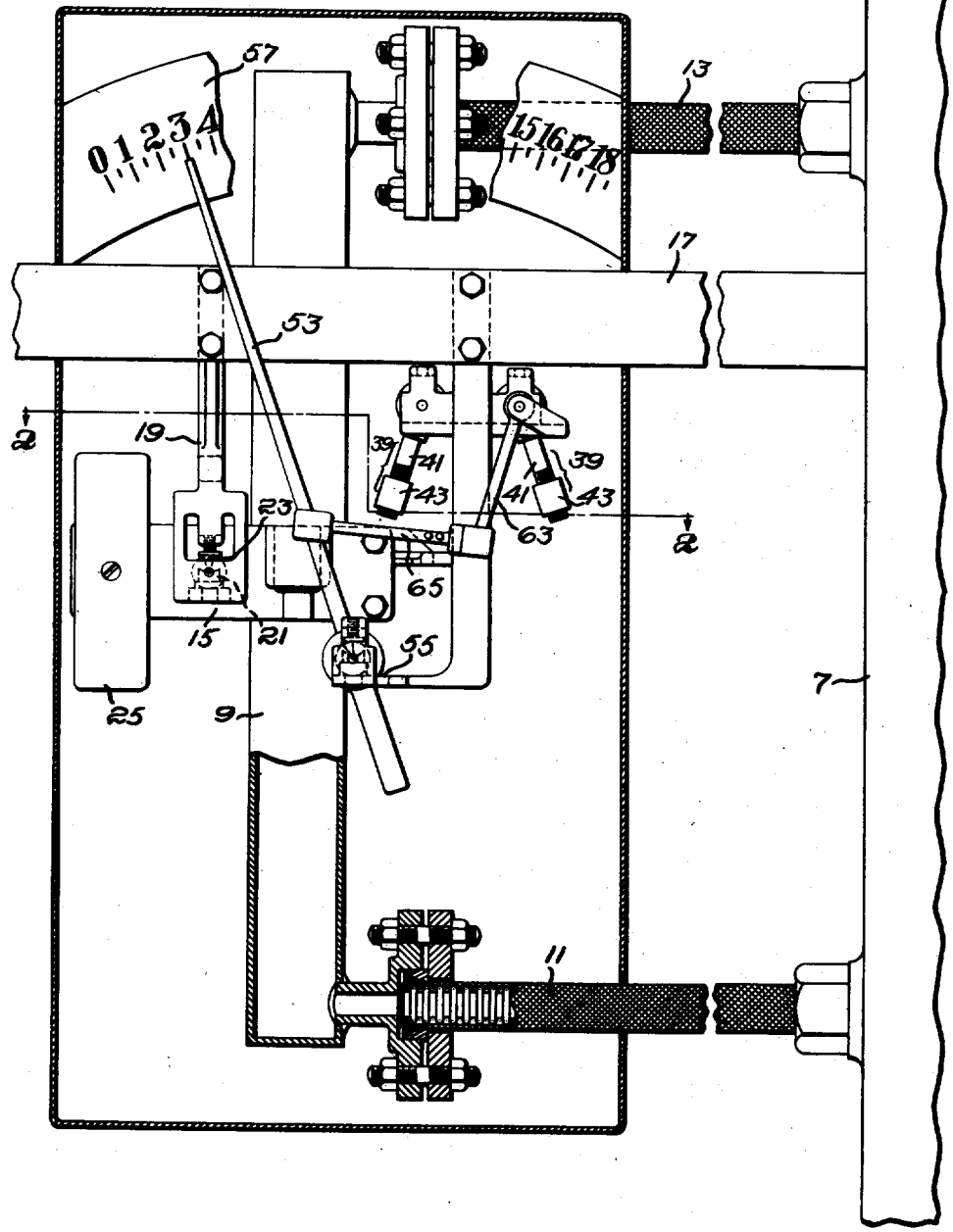

Inventor:
Leon S. Chalatow,
by Emery, Booth, Varney, Townsend
Attys

Patented Nov. 5, 1935

2,020,254

UNITED STATES PATENT OFFICE 2,020,254

APPARATUS FOR MEASURING LIQUID LEVEL

Leon S. Chalatow, Boston, Mass., assignor to Philip A. Jerguson, Medford, Mass.

Application July 14, 1934, Serial No. 735,242

4 Claims. (Cl. 73—54)

The object of the present invention is to provide an improved apparatus for measuring and indicating or otherwise manifesting the level of liquid in a container. It finds a particular application to steam generators or boilers, and for convenience I have here illustrated an apparatus suitable for such use and without limiting intention shall in the following description specifically refer to a boiler. My apparatus is of that type which measures a liquid level by determining the mass (weight) of a liquid column of uniform section, the altitude of which is equal to the height of water in the boiler or other container above a given base line. An important feature of the apparatus which I am about to describe is that it will not be affected by a tilting of the same as a whole. Thus in marine service, if the vessel rolls or pitches, the indicating means showing the boiler water level will not be affected thereby.

My invention will be well understood by reference to the following description taken in connection with the accompanying drawings, wherein:—

Fig. 1 is a front elevation of the device with parts broken away;

Fig. 2 is a section on the line 2—2 of Fig. 1 on a larger scale;

Fig. 5 is a diagram of the operation of the counteracting means during tilting of the system.

Figure 3:
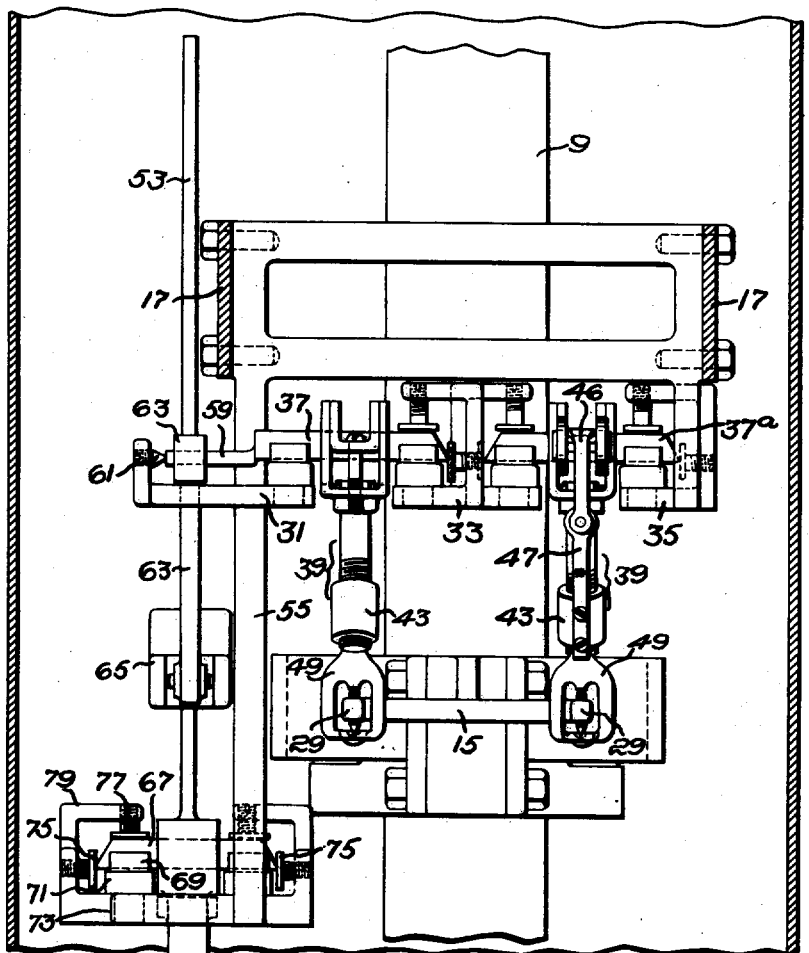
Fig. 3 is an end elevation as seen from the right in Figs. 1 and 2 with part broken away and parts in the rear omitted for the sake of clearness.

Referring to Fig. 1, I have there shown diagrammatically a steam boiler 7. A container, conveniently in the form of a metal cylinder of small diameter, is connected at its bottom to the water-containing space of the boiler by means of a long and flexible connection 11. In the case of a boiler which is under pressure the same pressure obviously must obtain in the container 9 and therefore the upper end of the same is connected by a similar connection 13 to the steam space of the boiler. The container 9 thus receives a column of water, the altitude of which represents the height of water in the boiler, being equal to the height of the water above a given base line represented by the point of connection of 11. The connections 11 and 13 are of such length and flexibility that the container 9 is substantially free to move up and down under gravity without impediment from such connections. To determine the mass of the water in the container and thereby determine the height of water in the boiler, the container is supported from a scale beam 15 and the variation in mass determined by the tendency of the same to disturb the equilibrium of the beam.

Referring particularly to Figs. 1 and 3, the apparatus as a whole may be suspended from a pair of stationary supports 17 from which (Figs. 1 and 3) depend a pair of spaced arms 19 providing supports for bearings 21 receiving a knife edge 23 passing through the scale beam 15 and providing a pivotal center for the same. On the left-hand end of the beam I have herein shown a counterweight 25 for balancing the parts of the beam proper and the empty container 9. As best seen in Fig. 2, the right-hand portion of the beam may be formed as an open frame providing a support for bearing seats receiving a knife edge 27 which projects in the manner of trunnions from the container 9, the container 9 thus being supported symmetrically, as shown in Fig. 2, in the plane of motion of the beam and extending above and below the beam so that, as more fully hereinafter explained, the center of mass of the container and its contents may lie substantially in the same horizontal plane as the pivotal center of the beam. The continuation of the beam at the right, herein formed as a separate piece, may be forked as seen in Fig. 2 and terminate in the two laterally spaced extensions 29 by which the beam is connected to suitable counteracting means presently to be described which resist the swinging of the beam and by their counteracting motion provide a measurement of the mass of liquid in the container.

For reasons more fully hereinafter to be explained I have here shown the counteracting means as formed of two masses which move in opposite senses and herein (see Fig. 3) the supports 17 carry a frame providing front, central and rear brackets 31, 33 and 35, respectively, supporting seats for the knife edge bearings 37 and 37a of two reversely mounted but otherwise similar pendulum devices 39 operating in different vertical planes substantially coincident with the arms 23.

Figure 4:
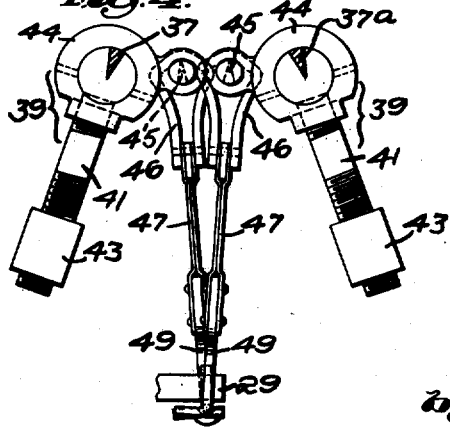
Fig. 4 is a detail of the counteracting means for the scale beam separated from adjacent supporting mechanism.

As best seen in Fig. 4, these devices may each consist of an arm 41 which may be threaded to receive adjustably the weight 43 and an angularly adjustable operating arm 44 through which may extend a transverse pin 45 formed to present a knife edge bearing for the yoke 46 of a connecting rod 47, the lower end of which carries a stirrup 49 encircling (see Fig. 3) the scale beam extension 29 through which is threaded a conically pointed screw providing a pivot point bearing having a seating in the cross-arm of the stirrup. As clearly seen in Fig. 4, the two pendulums which are connected respectively to the two scale beam extensions 29, as seen in Fig. 3, are oppositely disposed and on movement of the scale beam 15 tend to swing in opposite directions. Thus if the right-hand end of the scale beam viewing the figures tends to lift the weighted ends of the two pendulums and swing upwardly, the moments or lever arms of their masses are increased to resist the movement of the scale beam. This swinging movement is proportional to the force tending to unbalance the scale beam and thus to the increment of weight of water in the container 9 tending to disturb the beam. Preferably, as herein shown, the pendulums are of equal dimension and mass.

The operation of this counteracting means will be clearly understood from the diagram, Fig. 5. Referring to the drawings and assuming the scale beam in the horizontal position shown, it will be seen that the masses of the pendulum arms act respectively through the lever arms $pq$ and $st$ and are balanced by the resistance of the scale beam acting through the arms $qr$ and $rs$. Now if the whole system is tilted through an angle $\theta$ so that the line $m$ now represents the horizontal, the lever arms or moments will all be changed. It will be clear, however, that $p't'$ is equal to $pt \cos \theta$ and that $q's'$ is equal to $qs \cos \theta$ and therefore by subtraction $(p'q'+s't')$ is equal to $(pq+st) \cos \theta$. The masses of the pendulums are constant and the sum of their moments in the two positions and the sum of the moments through which the resistance of the scale beam acts vary similarly. The force acting on the scale beam is therefore not altered by the tipping movement and whatever the position of the system as a whole neither the pendulums nor the scale beam will move about their pivots because of the effect of this disturbance on the former.

To avail of this, the point of connection from the scale beam to the connecting rods 47, the center of gravity of the container 9 (by which in this instance I refer to the center of gravity of the container as such with a mean or normal column of water therein), the center of mass of counterweight 25, if used, and the pivotal center of the scale beam are all disposed in a straight line. Referring again to the diagram, Fig. 5, in a horizontal position of the parts the moments of the counterweight, of the container with its charge of water, and of the resistance provided by the counterbalancing pendulums are represented by their distances from the pivotal center of the scale beam. If we now assume the system as a whole to tip, for instance with the ship which carries it, so that $m$ now represents the horizontal, all the moments will change and be represented by distances parallel to this line from the several centers to the perpendicular to line $m$ through the pivotal center. It will be clear from the diagram that in view of the construction described the moments vary in the same manner and proportionately to the cosine of the angle $\theta$ through which the system as a whole is moved. The force exerted at the end of the scale beam acting on the pendulums is therefore unchanged. Due to the restraint of the connections 13 on the cylinder 9 the latter, while free to move up and down, cannot swing freely about knife edges 27 like a suspended weight but remains substantially parallel to fixed vertical objects on the ship. Since, however, its center of gravity is in the line of the beam as described, and not remote therefrom, this tilting movement with the ship provides for change of its moment in the manner just described. Displacement of the system as a whole, therefore, such as would arise by rolling of the ship in the plane of the scale beam does not disturb the equilibrium of the parts and the scale beam remains in the same position.

It will be understood that if the liquid level in the container 9 varies, the center of gravity of the container and its water column likewise varies and must depart from the line connecting the center of motion and the points at which the other forces act. Practical results, however, are obtained by the arrangement described which would not be the case if the center of mass were in its usual or normal position substantially removed from the said line.

The motion of the pendulum system under the influences of changes in the weight of the container may be used to actuate any suitable indicating, recording or integrating mechanism, herein exemplified by the pointer 53 having a knife-edge bearing on a bracket 55 depending from the supports 17 and cooperating with a scale 57. Referring to Fig. 3, the knife edge 57 of one of the pendulums is extended to provide a rock shaft 59 coaxial with the bearing line, supported at its end by the pivot screw 61 and carrying a crank arm 63 which oscillates the pointer 53 by means of the connecting link 65.

The various pivotal bearings in the mechanism 35 are desirably formed to be as frictionless as conveniently may be. I have illustrated one practical construction in some detail in the drawings and much of this detail will be readily understood from inspection and is unnecessary to describe in detail. Many of the knife edge bearings are of substantially similar construction and the description of the bearing for the pointer 53 well illustrated in Fig. 3 will suffice by way of example. Referring to that figure, the knife edge 67 may work in agate seats 69 which are carried by cups 71 having depending stems 73 entering suitable openings in the supporting bracket. The ends of the knife blade may be chamfered off as shown to the center of motion and flat-headed screws 75 may be adjusted to bear against the points so provided to maintain the blade against lateral motion. Similar screws 77 threaded into overhanging arms 79 of the bracket are presented to the back of the blade. It will be understood that they do not bear against the same but permit the blade to rock freely underneath. At the same time the clearance is made slight so that they serve to prevent the knife blade from jumping out of its seats under shock.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:—

1. In a device of the class described a container having a flexible connection for placing it in communication with a body of liquid to receive from said body a column of liquid, the altitude of which is definitely related to the depth of said body, the container being substantially free to move up and down under gravity by virtue of such connection, a pivoted beam from which said container is suspended, and counteracting means connected to the beam to resist tilting thereof, the pivot of said beam the point of connection thereof to said counteracting means and the normal center of gravity of the container being substantially aligned.

2. In a device of the class described a container having a flexible connection for placing it in communication with a body of liquid to receive from said body a column of liquid, the altitude of which is definitely related to the depth of said body, the container being substantially free to move up and down under gravity by virtue of such connection, a pivoted beam from which said container is suspended, counteracting means connected to the beam to resist tilting thereof comprising a pair of pendulums arranged to be swung thereby in opposite directions, a counterweight for the container, the pivot of said beam, the point of connection thereof to said counteracting means, the center of gravity of the counterweight and the normal center of gravity of the container being substantially aligned.

3. In a device of the class described a container having a flexible connection for placing it in communication with a body of liquid to receive from said body a column of liquid, the altitude of which is definitely related to the depth of said body, the container being substantially free to move up and down under gravity by virtue of such connection, a pivoted beam from which said container is suspended, and counteracting means connected to said beam to be moved thereby to resist tilting thereof, said means being in substantial equilibrium under gravity in all angular positions thereof in its plane of movement, the pivot of said beam, the point of connection thereof to said counteracting means and the normal center of gravity of the container being substantially aligned.

4. In a device of the class described a container having a flexible connection for placing it in communication with a body of liquid to receive from said body a column of liquid, the altitude of which is definitely related to the depth of said body, the container being substantially free to move up and down under gravity by virtue of such connection, a pivoted beam from which said container is suspended, and counteracting means connected to said beam comprising a pair of masses arranged for movement thereby having equal and opposite gravitational moments, the pivot of said beam, the point of connection thereof to said counteracting means and the normal center of gravity of the container being substantially aligned.

LEON S. CHALATOW.